United States Patent [19]

Streck et al.

[11] 3,974,094

[45] Aug. 10, 1976

[54] CATALYST SYSTEM FOR THE PRODUCTION OF POLYALKENAMERS

[75] Inventors: Roland Streck; Heinrich Weber, both of Marl, Germany

[73] Assignee: Chemische Werke Huls Aktiengesellschaft, Marl, Germany

[22] Filed: Nov. 13, 1974

[21] Appl. No.: 523,548

Related U.S. Application Data

[60] Continuation-in-part of Ser. No. 388,145, Aug. 14, 1973, abandoned, which is a division of Ser. No. 152,373, June 11, 1971, Pat. No. 3,816,384.

[30] Foreign Application Priority Data

June 11, 1970 Germany............................ 2028716

[52] U.S. Cl. ........................... 252/429 B; 526/159; 526/169; 526/296; 526/308
[51] Int. Cl.$^2$...................... C08F 4/22; B01J 31/14
[58] Field of Search............. 260/683.15; 252/429 B

[56] References Cited
UNITED STATES PATENTS

| | | |
|---|---|---|
| 3,449,310 | 6/1969 | Dall 'Asta et al. .......... 252/429 B X |
| 3,607,853 | 9/1971 | Oberkirch et al. .......... 252/429 B X |
| 3,631,010 | 12/1971 | Witte et al. ................. 252/429 B X |
| 3,719,652 | 3/1973 | Oberkirch et al. .......... 252/429 B X |
| 3,781,257 | 12/1973 | Pampus et al............... 252/429 B X |
| 3,798,175 | 3/1974 | Streck et al..................... 252/429 B |

*Primary Examiner*—Patrick P. Garvin
*Attorney, Agent, or Firm*—Millen, Raptes & White

[57] ABSTRACT

Polyalkenamers are produced by a ring-opening polymerization of cyclic olefins employing a catalyst system comprising (1) a tungsten or molybdenum compound; (2) an organoaluminum compound; (3) a vinylic chloride, bromide or iodide; and, optionally, (4) a compound containing a hydroxyl or sulfhydryl group; and conducting the polymerization in the presence of an ethylenically unsaturated halogenated hydrocarbon wherein one of the double bonded carbon atoms is substituted by chlorine, bromine or iodine or halogenated alkyl or aryl and at least one hydrogen atom.

11 Claims, No Drawings

CATALYST SYSTEM FOR THE PRODUCTION OF POLYALKENAMERS

This is a continuation-in-part of application Ser. No. 388,145, now abandoned, filed Aug. 14, 1973 as a division of application Ser. No. 152,373, filed June 11, 1971, now U.S. Pat. No. 3,816,384.

BACKGROUND OF THE INVENTION

This invention relates to a process for the preparation of polyalkenamers by the ring-opening polymerization of cyclic olefins employing a catalyst containing a metal of Subgroups 5 through 7 of the periodic table or a compound thereof and to novel polyalkenamers thus-produced.

It is known that cyclic olefins containing at least one substituted ring double bond can be polymerized under ring-opening conditions. The catalysts employed for this ring-opening polymerization are supported catalysts which contain a metal of Subgroups 5 through 7 of the periodic table, or the compounds thereof. See German published application DAS No. 1,072,811. Preferred catalysts are the reaction products of compounds of the above-mentioned metals with organometallic compounds or hydrides of metals of Main Groups 1 through 3 or Subgroup 2 of the periodic table, as well as optionally compounds which contain one or more hydroxy and/or sulfhydryl groups. See French Pat. Nos. 1,394,380 and 1,467,720; the published disclosures of Dutch patent application Ser. Nos. 65-10,331; 66-05,105; 66-14,413; 67-04,424; 68-06,208; and 68-06,211. The catalysts described therein contain compounds of molybdenum or tungsten and, as organometallic compounds, usually organoaluminum compounds. According to the published texts of Dutch patent applications Ser. Nos. 67-14,559 and 68-06,209, vanadium, niobium, tantalum, rhenium, technetium, or manganese can also be components of such catalyst systems.

In accordance with German unexamined published application DOS No. 1,909,226, it is also possible to employ catalyst systems containing a halide or an oxyhalide of molybdenum or tungsten wherein the stage of oxidation of the metal is 4, 5 or 6, an aluminum trihalide.

With the aid of these catalysts, a great variety of polymers can be prepared with structures which are strictly regular along the polymer chains, the structure of the polymer units being exclusively dependent on the cycloolefin employed as the monomer. Thus, it is possible, for example, to produce linear polymers by the polymerization of monocyclic olefins; polymers having recurring polymer units containing a single ring by the polymerization of bicyclic olefins; and, in general, polymers having recurring polymer units which contain one ring less than the starting monomer by the polymerization of polycyclic olefins.

The polyalkenamers produced by the polymerization of monocyclic olefins are of particular interest for the additional reason that, depending on the cycloolefin employed, it is possible to prepare polymers having differing double bond content. Thus, polybutenamers which are free of vinyl groups, i.e., pure 1,4-polybutadienes, are obtained from cyclobutene, 1,5-cyclooctadiene, and 1,5,9-cyclododecatriene. Polypentenamers are obtained from cyclopentene which have three —$CH_2$-groups disposed between the double bonds. Polyoctenamers are produced from cyclooctene which correspond to a completely regular semihydrogenated 1,4-polybutadiene. Polydodecenamers are prepared from cyclododecene corresponding to a two-thirds hydrogenated 1,4-polybutadiene in which remaining double bonds are arranged in the molecule at regular intervals. Accordingly, it is possible to produce polymers, the structures of which represent variations from pure 1,4-polybutadienes, free of vinyl groups, to strictly linear polyethylenes or polymethylenes.

It is likewise known that the average molecular weight or the degree of polymerization of a polymer affects properties of the polymer and thus its usefulness in any particular field of application, as well as its characteristics during the production and processing. Thus, polymer solutions of equal weight concentration of polymer are more viscous, the higher the molecular weight of the polymer in solution. Thus, difficulties are encountered with solutions of very high-molecular polymers, e.g., during the polymerization, for example, in the mixing or obtaining satisfactory heat exchange, and increased energy requirements for the agitating step result. Also, the further processing of very high-molecular polymers is difficult. For this reason, they are often degraded mechanically, chemically, or thermally prior to the final shaping procedure, eg., injection-molding, extrusion, or calendering.

The polyalkenamers obtained during the ring-opening polymerization of cycloolefins are normally very high-molecular. Because of the above-described difficulties with polymers of very high molecular weight, attempts have been made in the prior art to develop processes for regulating the molecular weight of the polymers producible by a great variety of polymerization methods. In the polymerization of $\alpha$-olefins with organometallic mixed catalysts, the so-called hydrogen regulation, i.e., polymerization in the presence of a certain partial hydrogen pressure, proved useful. Other possibilites for controlling the molecular weight of $\alpha$-olefin polymers were varying the catalyst components, elevating the temperature or adding alkylzinc or alkylcadmium compounds during the polymerization.

Although organometallic mixed catalysts or related catalyst systems are also employed in the ring-opening polymerization of cycloolefins, the methods for molecular weight regulation employed in the polymerization of the $\alpha$-olefins either are unsuccessful or exhibit definite disadvantages which made the use of such methods difficult, if not impossible. Thus, hydrogen, for example, up to an excess pressure of 4 atmospheres exerts practically no influence at all on the molecular weight of the polyalkenamers prepared by the ring-opening polymerization of cycloolefins. Even if hydrogen were effective at pressures higher than those mentioned above, the hydrogen regulating method would require increased investment costs, since the plant would have to be designed for pressures which do not occur in the unregulated ring-opening polymerization of the cycloolefins which, under normal pressure, are present in the liquid phase or in solution at the polymerization temperature. Although the molecular weight of the polyalkenamers can be reduced by employing a higher polymerization temperature, the yield and the steric uniformity of the polymers are impaired in so doing. Moreover, due to the temperature sensitivity of the mixed catalysts customarily employed for the ring-opening polymerization of cycloolefins, such catalysts become inactive above 40°–50° C. in a short period. Also, modifications of an optimal catalyst system can strongly impair yield. See, for example, Dutch patent application Ser. No. 66-05,105, p. 16.

The last of the above-mentioned methods for controlling the molecular weight during the polymerization of α-olefins with organometallic mixed catalysts, i.e., using an alkylzinc or alkylcadmium compound as the controlling agent, is of little practical use, even if it were effective in the ring-opening polymerization of cycloolefins, because such zinc and cadmium compounds are very toxic and can be prepared only with difficulty and thus are expensive.

The only process heretofore known wherein polymers are obtained which exhibit improved processability is described in British patent No. 1,098,340. In this process, cyclic monoolefins are copolymerized under ring-opening in the presence of a conjugated diolefin, such as, for example, butadiene, isoprene, or 1,3-pentadiene. The thus-produced copolymers contain polymer units derived from both the cycloolefin and the conjugated diolefin, in varying molar ratios.

As shown in Comparative Experiments N through T in Table 3, conjugated dienes, although they influence the molecular weight of the polyalkenamers produced in polymerizations conducted in their presence, also are more or less strong catalyst poisons. Thus, for example, the presence of only 1 mol% of 1,3-butadiene, 5 mol% of isoprene, 5 mol% of 2,3-dimethyl-1,3-butadiene, or 10 mol% of 2,4-hexadiene, results in the complete inhibition of the polymerization catalyst and no polymer is obtained. Cyclic conjugated diolefins also cause a pronounced lowering of the yield of polymer. Moreover, it is not possible using such dienes as polymerization regulators to produce polymers which are waxy or oil-like products having very low molecular weights, e.g., about 500–5000.

In our prior filed U.S. application Ser. No. 70,497 filed Sept. 8, 1970, now U.S. Pat. No. 3,816,382, we claim a process for the regulation of molecular weight of polyalkenamers by the addition of monoolefins, preferably α-olefins, during the polymerization. The molecular weight of polyalkenamers can be regulated with a very high degree of success by this process. However, there is a great interest in polymers having functional terminal groups, which can be employed for further reactions, such as, for example, cross-linking reactions or for the construction of other defined polymer structures, e.g., block copolymers or stellate polymers. For example, a stellate structure is obtained by the reaction of a unilaterally lithium-terminated polymer, e.g., a polybutadiene or polystyrene produced in a polymerization which employs butyllithium as the catalyst, with a tri- or tetrahalogen compound, such as, for example, methyltrichlorosilane, silicon tetrachloride, or carbon tetrabromide. A chain of polymer terminating at both ends in halogen can be reacted with a unilaterally metal-terminated chain of another polymer to form block copolymers. Polymer chains terminating in hydroxyl groups can be cross-linked with di-, tri-, or polyisocyanates or other polyfunctional compounds, such as, for example, acid chlorides of polybasic acids. These examples are typical but not complete and merely illustrate that such reactions of "telechelic polymers" (U.S. Pat. No. 3,244,664) have gained increasing importance in recent times. Functional end groups also often influence the practical application properties of the polymers and effect, for example, an improved adhesion to surfaces and/or an improved compatibility with other polymers. Thus, there is an increasing need for processes yielding polymers having defined functional end groups.

Accordingly, it is an object of the present invention to provide a process which makes possible, in a simple manner, to simultaneously regulate the molecular weight of polyalkenamers produced by the ring-opening polymerization of cyclic olefins and to introduce functional terminal groups into the polymer molecule. Another object is to provide novel polymers thus-produced. Other objects will be apparent to those skilled in the art to which this invention pertains.

SUMMARY OF THE INVENTION

According to this invention, the molecular weight of polyalkenamers produced by the ring-opening polymerization of cyclic olefins employing a catalyst containing a metal of Subgroups 5 to 7 of the periodic table and conducting the polymerization in the presence of an ethylenically unsaturated halogenated hydrocarbon wherein one of the double bonded carbon atoms is substituted by chlorine, bromine or iodine or halogenated alkyl, cycloakyl, aryl or alkaryl and at least one bears a hydrogen atom.

DETAILED DISCUSSION

The cyclic olefin and cycloolefin employed in the process of this invention are unsaturated hydrocarbons containing one or more rings, at least one of which contains at least one unsubstituted non-conjugated double bond.

The cycloolefins polymerized according to the process of this invention preferably contain 4 to 12 ring carbon atoms and a total of 4 to 20, preferably 4 to 15 carbon atoms; from 1 to 3, preferably 1 to 2 rings, which can be fused or separate cycloaliphatic rings; whose ring carbon atoms are unsubstituted or one or more of which are substituted with lower-alkyl, e.g., of 1 to 4 carbon atoms, cycloalkyl, e.g., of 5 to 7 carbon atoms, or aryl, alkaryl or aralkyl, e.g., of 6 to 10 carbon atoms.

Preferred classes of starting cycloolefins are the following:

a. those containing 1 to 2 non-conjugated double bonds, preferably one;
b. those containing 1 to 2 rings, preferably one;
c. those of (a) and (b) containing two fused rings;
d. those of (a), (b), and (c) containing 0–2 lower-alkyl groups as the sole substituents on the ring carbon atoms, preferably 0;
e. those of (d) containing 1–2 methyl groups as the sole substituents on the ring carbon atoms;
f. those of (a), (b), (c), (d), and (e) wherein the unsaturated carbon atoms each bear a hydrogen atom; and
g. those of (a), (b), (c), (d), (e) and (f) wherein the ring of the cycloolefin containing the unsaturation contains 5 or 7 to 12 ring carbon atoms.

Examples of cycloolefins which can be polymerized according to the process of this invention are cyclobutene, cyclopentene, cycloheptene, cyclooctene, cyclononene, cyclodecene, cycloundecene, cyclododecene, cis, cis-1,5-cyclooctadiene, 1-methyl-1,5-cyclooctadiene, 3,7-dimethyl-1,5-cyclooctadiene, 1,5,9-cyclododecatriene, 4,5-dimethyl-1,4,7-cyclodecatriene, cis,trans-1,5-cyclodecadiene, norbornene, dicyclopentadiene, dihydrodicyclopentadiene, and 4- phenylcyclooctene, and mixtures thereof. Cycloolefins which cannot be polymerized with ring-opening, e.g., cyclohexene and the derivatives thereof, are not employed as starting monomers in the polymerization process of this invention.

The polymerization of this invention is conducted in the presence, as a polymerization regulator, of an unsaturated halogenated hydrocarbon as defined herein. These compounds can be represented by the formula

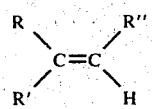

wherein R, R' and R'' are hydrogen, chlorine, bromine, iodine, alkyl, cycloalkyl, aryl, alkaryl or the corresponding halogenated groups, at least one of R, R' and R'' being a halogen atom or halogenated alkyl, cycloalkyl, aryl or alkaryl but no more than one of R, R' and R'' being a halogen atom. For example, R, R' and R'' can be straight-chain or branched saturated alkyl of 1-20, preferably 1-12, carbon atoms, or cycloalkyl containing 3-12, preferably 5-12 ring carbon atoms, 1, 2 or 3 separate or fused rings, and 3-20, preferably 5-12 carbon atoms, unsubstituted or substituted by one or more halogen atoms. Examples of aryl are those containing 6-14 carbon atoms and 1, 2 or more separate or fused rings, unsubstituted or substituted by unsubstituted or halogenated alkyl or cycloalkyl as defined above.

Examples of alkyl are methyl, ethyl, propyl, isopropyl, butyl, iosbutyl, tert.-butyl, hexyl, heptyl, octyl and higher straight and branched chain alkyl. Cycloalkyl includes cyclopropyl, cyclobutyl, cyclopentyl, cyclohexyl, 2-methyl cyclopentyl, 2,6-dimethylcyclopentyl, 4-methylcyclohexyl, 3,5-dimethylcyclohexyl, 2-methylcyclohexyl, cycloheptyl, cyclooctyl, octohydronaphthyl, and the corresponding groups substituted on one or more ring carbon atoms by alkyl of 1-4 carbon atoms. Aryl includes phenyl, p-diphenyl, naphthyl, ar-lower-alkyl, e.g., p-benzylphenyl, benzyl, phenethyl, 2-phenyl propyl and benzhydryl; tetrahydronaphthyl, 6-tetrahydronaphthyl idenyl, dihydroindenyl. Alkaryl includes aryl substituted on one or more ring carbon atoms by alkyl of 1-4 carbon atoms, preferably methyl, e.g., p-tolyl, sym.-xylyl, etc.

Especially preferred are monohalogenated aliphatic α-olefins substituted only on a double bonded carbon atom by a single chlorine, bromine, or iodine atom, e.g., vinyl chloride, vinyl bromide, vinyl iodide, propenyl chloride (1-chloropropene-1), isopropenyl chloride (2-chloropropene-1), or isocrotyl chloride (1-chloro-2-methylpropene-1).

Other specific examples of unsaturated halogenated hydrocarbons of Formula I are allyl fluoride, allyl chloride, allyl bromide, allyl iodide, crotyl chloride (1-chlorobutene-2), 1,3-dichloropropene, 2-methylene-1,3-dichloropropane, p-bromostyrene, 2,4,6-tribromostyrene, methallyl chloride (3-chloro-2-methylpropene-1), p-iodocinnamyl chloride, p,p'-dibromostilbene, 5,5,5-trichloropentene-2, 8-chloro-10-fluoro-12-bromohexadecene-3, 1-chloro-4-allylnaphthalene, 1-buten-(2)-yl-9-fluoranthracene, o-bromo-p'vinylbiphenyl, m-cyclopentyl-p-chlorostyrene, or 3-chlorobutene-1, preferably 1-bromoctadecene-9, 1,4-dichlorobutene-2, 1,4-dibromobutene-2, 11-chloroundecene-1, 5-bromopentene-1, 5-chloropentene-1, 4-chlorobutene-1, 1,6-dichlorohexene-3, 1,6-dibromohexene-3, 1,8-dichloroctene-4, 1,8-dibromoctene-4, and 3,4-dichlorobutene-1.

The unsaturated halogenated hydrocarbons can be utilized as the pure compounds or in the form of mixtures, e.g., the halogenated mixtures which are very inexpensively produced in various petrochemical processes, for example during the high-temperature chlorination of olefins or the chlorination or hydrochlorination of diolefins.

When a halogenated olefin is employed as the regulator which is substituted only on one side of the double bond by halogen, e.g., vinyl chloride, the resulting polymers possess, on the average, one halogen-containing end group per macromolecule. However, macromolecules can also be produced which have no halogen-containing end group at all or which have two halogen-containing end groups. Macromolecules with two halogen-containing end groups are always obtained when using controlling agents which are halogenated on both sides of the double bond, for example, 1,4-dibromobutene-2, 1,6-dichlorohexene-3, 1-chloro-7-bromoctene-3, p,p'-dibromostilbene, or o-fluoro-1-chlorallybenzene.

A surprising peculiarity of the monohalogenated aliphatic α-olefins substituted only on the double bond by chlorine, bromine, or iodine is that they exert, even in very small quantities ranging in the order of magnitude of catalyst concentration, a favorable influence on the velocity and yield of the polymerization, in addition to controlling molecular weight. This activator effect cannot be explained by means of any of the heretofore known theories regarding the mechanism of the ring-opening polymerization of cyclic olefins.

With the aid of these activators, it is also possible to develop catalyst systems based on tungsten hexachloride and ethylaluminum sesquichloride or diethylaluminum chloride, which normally exhibit only minor catalytic activity, which are highly satisfactory polymerization catalysts. Ethylaluminum dichloride containing catalysts, which have heretofore shown the highest activity, is manufactured in smaller quantities than the two other above-mentioned ethylaluminum halogenides and, moreover, can be handled only in dilute solutions, due to its melting point of +32° C. Furthermore, catalysts containing ethylaluminum dichloride have a strong tendency to promote secondary reactions of a cationic type. Thus, for example, they have an alkylating effect on aromatics and polymerize branched olefins, which can result in gelling.

By employing the "activating regulators" or "regulating activators" of this invention, a considerable increase in catalyst activity is always attained, even in the case of catalysts containing ethylaluminum dichloride, so that high conversion rates can be obtained, even when the polymerization is conducted in dilute solutions, which reaction ordinarily progresses very unsatisfactorily, especially in case of cyclopentene. This is also advantageous from the viewpoint of process technique, for it is possible to polymerize a higher proportion of the monomer rather than being forced, as in case of bulk polymerization, to utilize the monomer as the solvent and work with small conversions, due to the viscosity of the thus-produced polymer solution, and to regenerate and recycle the larger portion of the monomer. Besides, especially in the case of cyclopentene, the polymerization need no longer be conducted at the very uneconomical low temperatures of −20° to −30° C. Instead, the same or even still higher yields are obtained under conditions which are technically and economically more advantageous (0° to 20° C.).

The ring-opening polymerization of cyclic olefins can be conducted by conventional procedures employing known catalysts. Thus, suitable catalysts are supported catalysts containing the metal of Subgroups 5 through 7 of the periodic table, for example, in the form of the carbonyl, sulfide, or superficially reduced oxide on a support such as, for example, aluminum oxide, aluminum silicate, or silica gel. Also suitable are mixed catalysts, e.g., containing a compound of a metal of Groups 5 through 7 of the periodic table and an organometallic compound or hydride or a metal of Main Groups 1 through 3 or Subgroup 2 of the periodic table and optionally, also a compound containing one or more hydroxy and/or sulfhydryl groups. Also suitable are catalysts containing a halide or oxyhalide of molybdenum or tungsten wherein the degree of oxidation of the metal is 4, 5, or 6, and which contain an aluminum trihalide. Preferably, mixed catalysts are employed containing a molybdenum compound or especially a tungsten compound. Preferred organometallic compounds are organolithium, organomagnesium and organoaluminum compounds, especially methylaluminum dichloride, ethylaluminum dichloride, methylaluminum sesquichloride, ethylaluminum sesquichloride, dimethylaluminum chloride and diethylaluminum chloride. Compounds containing one or more OH— and/or SH-groups optionally can be employed concomitantly as a catalyst component, e.g., water, hydrogen sulfide, hydroperoxide, alkyl hydroperoxides, mercaptans, hydrodisulfides, alcohols, polyalcohols, polymercaptans and hydroxymercaptans. Saturated and unsaturated alcohols and phenols, viz., n-propanol, n-butanol, sec.-butanol, isobutanol, allyl alcohol, crotyl alcohol, phenol, o-m m-, and p-cresol, α- and β-naphthol, eugenol and benzyl alcohol, especially methanol, ethanol, isopropanol, or tert.-butanol, are preferred. However, when employing an "activating regulator" according to this invention, compounds containing OH— and/or SH-groups offer only minor advantages and can be omitted.

The polymerization can be conducted continuously or discontinuously. The reaction temperature can vary widely, e.g., between −70° C. and +50° C. However, temperatures between −30° and +30° C. are preferred.

The amount of regulator which is added and, as a consequence, the molecular weight of the polymers produced, can be varied widely without any disadvantageous effects on the yield and the stereospecificity of the polymerization. When employing, for example, cyclobutene or cyclopentene as the monomer, it is thus possible to produce rubber-like products of a high Mooney viscosity, which can be extended with a large amount of oil, as well as other readily processable rubber types.

It is also possible to manufacture highly tacky products of low viscosity and syrupy to oily liquids which can be utilized, for example, as drying oils directly, or after an additional reaction, as binders for varnishes or coating agents.

The amount of regulator needed to attain a product of a specific consistency depends, inter alia, on the type of the monomer employed, the type or regulator employed, the catalyst employed, and the selected polymerization reaction conditions. The exact amount of regulator can readily be determined by a few preliminary experiments.

The amount of unsaturated halogenated hydrocarbon employed can vary from about 0.001–50 molar percent, based on the monomer. Generally, the use of about 0.001–5, preferably about 0.003–5, more preferably about 0.01–5 mol-percent, and more preferably about 0.01–2 mol-percent, based on the monomer employed, results in the production of polyalkenamers having molecular weights in the range of commercial elastomers or thermoplastics. The addition of between about 7 and 50 molar percent, preferably between about 10 and 20 mol-percent of the regulator, based on the monomer employed, generally is required for the production of low-viscosity to oily products.

These data apply when using regulators which do not simultaneously increase the polymerization velocity and the polymer yield. In contrast thereto, when using "activating regulators," about one-tenth of the above quantities often is sufficient for the preparation of polyalkenamers having molecular weights in the range of commercial elastomers or thermoplastics.

Since the activating effect of the monohalogenated aliphatic α-olefins which are substituted only on the double bond by a single chlorine, bromine or iodine atom is clearly perceptible with the addition of a very small amount thereof, e.g., approximately 1 molar percent of the heavy metal component of the catalyst, especially in case of tungsten compounds and particularly in case of tungsten hexachloride, these "activating regulators" can also be considered to be components of the catalyst system and can be employed primarily for the purpose of improving yield. Any desired reduction of the molecular weight of the polymer lower than would be obtained with the use of these additives by themselves, can be achieved by the additional use of other regulators, for example the previously proposed α-olefins. This combination of "activating regulators" and α-olefins is particularly advantageous when very low-molecular products are to be manufactured, e.g., oils, and no importance is attributed to functional end groups of the polymer because such end groups would not offer any special advantage for the intended purpose for which the products are to be used.

The polymerization process of this invention is preferably conducted in solution. For this purpose, inert solvents inert under the reaction conditions are employed, e.g., benzene, cyclohexane, methylcyclohexane, isopropylcyclohexane, "Decalin", hydrogenated kerosene, paraffin oil, methylene chloride, trichloroethylene and preferably hexane, heptane, octane, and perchloroethylene. The amount of solvent employed can vary widely, e.g., 5 to 2,000% by weight, preferably 50 to 1,000% by weight, based on the monomer employed. Low-molecular oily polymers can also advantageously be prepared without a solvent by mass polymerization, so long as the viscosity of the thus-reacted mixture remains reasonably low.

The amount of catalyst which need be employed is very low. For example, in case of tungsten hexachloride, only about 0.5–2 millimols per liter of reaction volume, or about 1 mol per 1,000–5,000 mols of monomer, is required. When using an "activating regulator," this quantity can be reduced to approximately one-tenth the amount, in spite of the improved yield. The concentration of organometallic catalyst component depends primarily on the purity of the monomer and the solvent employed, i.e., the amount of moisture, peroxides, proton-active impurities, such as alcohols, acids, and other compounds reacting with alkyl metals, such as ethers, amines, ketones, aldehydes, etc., present therein. When the monomer and the solvent are subjected to a very thorough preliminary purification and the reactants are handled with strict exclusion of air in thoroughly dried reactors, molar ratio of heavy metal compound to active alkyl metal, i.e., an alkyl metal which has not been bound or destroyed by impurities or any additional additives present, of about 1:4 to 1:1, preferably less than 1:1, is generally sufficient. Outside of this range, the catalysts are normally less active.

As in the case of regulating the molecular weight of polyalkenamers with monoolefins, surprisingly it is not necessary in the process of this invention that the regulator be present at the beginning of the polymerization in order to obtain the desired effect. The regulator can, if desired, be added after polymerization has begun. All that is required is that the catalyst is still active, i.e., the regulator must be added prior to the inactivation of the catalyst. It is thus possible to use regulators which tend to form homopolymers which are insoluble in the reaction mixture if exposed to the catalyst, either by themselves or in a mixture with cycloolefins at the beginning of the polymerization, and thus inactivate the catalyst by inclusion in the insoluble polymer, or which enter into secondary reactions with the catalyst components prior to the actual formation of the catalyst, but which do not react in such a manner with the finished catalyst. The tendency of a regulator to promote homopolymerization or enter into such secondary reactions can quickly be determined by preliminary experiments. Because of this characteristic, it is also possible when an unforeseen rise in the viscosity of a polymerization batch takes place, as occasionally happens, to keep the contents of the kettle stirrable by adding the regulator before inactivation of the catalyst, thus avoiding the extensive work connected with emptying a batch which has become too viscous or even gelled.

The preferred catalyst systems employed in the polymerizations of this invention are novel systems comprising
1. a tungsten or molybdenum compound;
2. an organoaluminum compound;
3. a monohalogenated aliphatic α-olefin substituted only on a double bonded carbon atom by a single chlorine, bromine or iodine atom; and, optionally,
4. a compound containing one or more hydroxyl and sulfhydryl groups.

Preferred aspects of the catalyst systems of this invention comprise one or more of any of the following:
a. component (1) is tungsten hexachloride or tungsten oxytetrachloride;
b. component (2) is an alkyl aluminum halide, preferably ethylaluminum dichloride, ethylaluminum sesquichloride or diethylaluminum monochloride;
c. component (3) is vinyl chloride, vinyl bromide and/or vinyl iodide;
d. the molar ratio of component (1) to component (2) is less than 1:1, preferably between 1:1 and 1:50;
e. the molar ratio of component (1) to component (3) is less than 100:1, preferably less than 10:1;
f. the molar ratio of component (1) to component (4) is about 1:0.1 to 1:2; and/or
g. the molar ratio of component (1) to the difference of the amounts employed of component (2) minus component (4) is between about 1:1 and 1:4.

After the termination of the polymerization reaction, the polyalkenamers can be isolated and purified in a conventional manner. If the polyalkenamers are obtained in solution or in the liquid phase, the residues of the catalyst can be removed with an alcohol or other compound having an acidic hydrogen, by washing out the polymer-containing phase with an aqueous or aqueous-alcoholic solution of agents having a dissolving effect on the catalyst residues, which latter are first present as an alcoholate or a salt of the other compound having an acidic hydrogen atom used to remove the catalyst. Such substances with a dissolving effect on the catalyst are, for example, acids, bases, or complex-forming agents, such as acetylacetone, citric or tartaric acid, ethylenediaminetetraacetic acid, nitrilotriacetic acid, etc.

After the catalyst has been removed, the polymers are separated by precipitation, e.g., by pouring into a precipitant such as, for example, methanol, isopropanol, or acetone, or distilling off the solvent, e.g., by blowing in steam, or by introducing the polymer solution through nozzles into hot water. When the polymer can be precipitated from the solution of the monomer in the form of flakes or a powder, the polymer can first be separated, e.g., by filtration, centrifuging, or decanting from the liquid and thereafter treated to remove the catalyst residues.

In order to protect the polyalkenamers against oxidation, gelling, and other aging phenomena, it is possible to add stabilizers thereto, e.g., aromatic amines or the sterically hindered phenols, at various stages of processing. Also, an optional further purification step can be conducted by reprecipitating the polymer if this should be necessary, to obtain a product of the desired purity. After these operations, the polymer can then be dried in a conventional manner.

In contrast to the previously known polyalkenamers which, although called linear polymers, in reality, are macrocyclic compounds, the polyalkenamers prepared in accordance with the process of this invention are truly linear polymers of a strictly regular structure with exactly defined terminal groups. Such polymers have not heretofore been produced.

The polyalkenamers produced in accordance with the process of this invention are, in contrast to the polymers known heretofore which although called linear polymers are in reality macrocyclic compounds, true linear polymers of a strictly regular structure with exactly defined end groups, which have not been described heretofore.

By the ring-opening homopolymerization according to the process of this invention of monocyclic monoolefins of the general Formula I

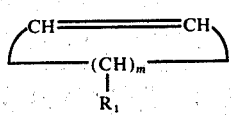

polymers of the general Formula II are obtained:

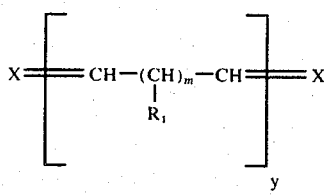

wherein in both instances $R_1$ is hydrogen or a straight-chain or branched saturated alkyl of 1–6 carbon atoms, saturated cycloalkyl of 3–6 carbon atoms or aryl of 6–10 carbon atoms, and X, m and y have the values given below.

The various

groups in the molecule can be alike or different, i.e., $R_1$ can be hydrogen in every instance in the molecule so that the number of $R_1$ groups which are hydrogen is $m$ or from 1 to $m$ of the $R_1$ groups can be alkyl or aryl. Thus, by the ring-opening homopolymerization of unsubstituted monocyclic monoolefins, i.e., compounds of the general Formula I wherein $R_1$ is hydrogen, there are obtained polymers of the general Formula III:

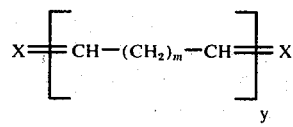

wherein X, y and m have the values given below.

By the ring-opening homopolymerization of monocyclic diolefins of the general Formula IV

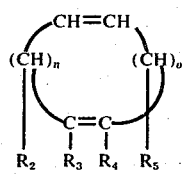

there are obtained polymers of the general Formula V

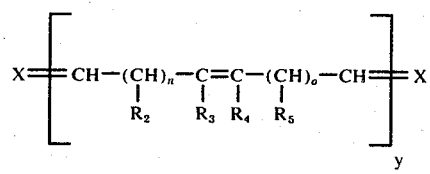

wherein, in Formulae IV and V, X, y and o have the values given below, and $R_2$, $R_3$, $R_4$ and $R_5$, which are alike or different, have the same value as $R_1$. Thus, $R_2$ and/or $R_5$ groups can be disposed throughout the polymer molecule. In other words, n of the $R_2$ groups and/or o of the $R_5$ can be hydrogen or 1 to n of the $R_2$ groups and/or 1 to o of the $R_5$ groups can also be alkyl or aryl, respectively. The same applies to $R_3$ and/or $R_4$ groups, which likewise can both be hydrogen or either or both can also be identical or different alkyl or aryl groups. Thus, by the ring-opening homopolymerization of unsubstituted monocyclic diolefins of Formula IV wherein $R_2$, $R_3$, $R_4$ and $R_5$ are hydrogen, there are obtained polymers of the general Formula VI.

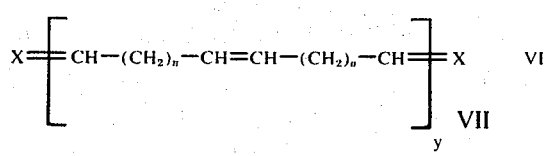

Homopolymers of the general Formula VII

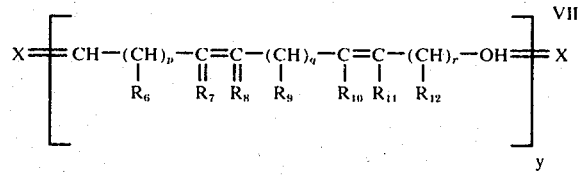

are produced by the ring-opening polymerization of monocyclic triolefins of the general Formula VIII

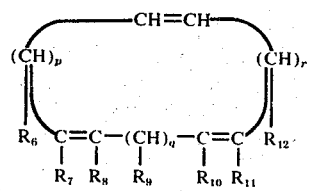

wherein X and y have the values given below and $R_6$, $R_7$, $R_8$, $R_9$, $R_{10}$, $R_{11}$, and $R_{12}$, which can be alike or different, have the same values as $R_1$. The various $R_6$, $R_9$ and/or $R_{12}$ groups can be identical or different groups, i.e., all p of the $R_6$ groups, all q of the $R_9$ groups and/or all r of the $R_{12}$ groups can be hydrogen; or from 1 to p of the $R_6$ groups, 1 to q of the $R_9$ groups and/or 1 to r of the $R_{12}$ groups can, respectively, be an alkyl or aryl group. The same is true of the $R_7$, $R_8$, $R_{10}$ and/or $R_{11}$, which likewise can all represent hydrogen, or individually or severally, can be identical or different alkyl or aryl groups.

By the ring-opening homopolymerization of norbornene there are obtained polymers of the general Formula IX.

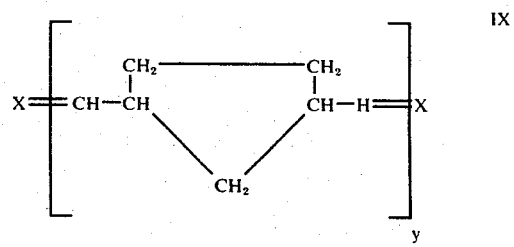

wherein X and y have the values given below.

Polymers containing two or more of the above-described polymer units in a statistical distribution or in larger block sequences are produced during the ring-opening copolymerization of two or more of the above-described cycloolefins in the presence of the claimed polymerization regulators.

In Formulae II, III, V, VI, VII and IX, $m$ is the integer 2 or 3 or an integer from 5 to 10 inclusive; $n$ and $o$ each integers from 1 to 7, the sum of which is an integer from 3 to 8; $p$, $q$, and $r$ each are the integer 1 or 2; and $y$ is an integer from 2 to about 50,000, preferably 5 to about 20,000.

The novel polyalkenamers of this invention are characterized structurally by their novel terminal groups. These groups are alkylidene radicals derived from the ethylenically unsaturated halogenated hydrocarbon employed in the polymerization as the polymerization regulator. Thus, in Formulae II, III, V, VI, VII and IX, X is

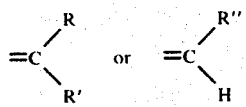

wherein R, R' and R''' are as defined above.

The solid polymers or oligomers of the general Formulae II, III, V, VI, VII, and IX exhibit RSV-values (reduced specific viscosity values) of 0.01–10.00 dl./g. The low-molecular weight fluid polymers have average molecular weights in the range of about 500 to 25,000. Average molecular weights mean the arithmetic means of the molecular weights.

In former publications Natta and Dall'Asta stated (Angew. Chem. 76, 765 (1964) and J. Pol. Sci. 6, 2405 (1968)) that polyalkenamers prepared by ring-opening polymerization of cycloolefins have a strictly linear structure. Later on Calderon alleged that those polyalkenamers are in reality macrocyclic compounds (J. Am. Chem. Soc. 90, 4133 (1968)). This proposition was proved by isolation and identification of macrocyclic oligomers with polymerization rates up to 11 (Adv. Chem. Ser. 91, 399 (1969)).

The novel polyalkenamers can unexpectedly and readily be worked up, as they have a lower reduced melt viscosity. Therefore they may be worked up by lower temperature, e.g., by calendering, rolling or injection moulding, whereby the energy-costs are much smaller.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. Unless stated otherwise, the reduced specific viscosity (RSV) and the gel contents were determined in benzene at 25° C.

EXAMPLES 1–12 AND COMPARATIVE EXPERIMENTS A–E

Into a three-tube 1-liter glass flask with agitating unit and reflux condenser with a dropping funnel attached thereto were introduced, respectively, 100 ml. (77.8 g.) of cyclopentene and 150 ml. of hexane and were brought under an atmosphere of extremely pure nitrogen, to the reaction temperature by cooling or heating, and are mixed with the components of the polymerization catalyst. After the predetermined reaction period, the catalyst was destroyed by the addition of 50 ml. of methanol containing 3 g. of potassium hydroxide and 2 g. of 2,6-di-tert.-butyl-p-cresol ("IONOL"). After the addition of 100 ml. of distilled water and 50 ml. of methanol, so that a second phase containing 50% methanol was formed, the reaction mixture was then further agitated for 3 hours, to wash out the catalyst residues. The aqueous-methanolic phase was then removed by pipetting and the reaction mixture was washed twice with 50% aqueous methanol. The polymer was then precipitated by pouring the organic phase into 3 liters of methanol. The precipitated product was dissolved once again in 250 ml. of hexane, for purposes of an additional purification, and reprecipitated with methanol to which was again added 2 g. of stabilizer ("IONOL"). After decocting the polymer for 2 hours with 500 ml. of pure methanol, it was dried for 40 hours at 50° C. in a vacuum drying chamber. The thus-purified polymer was employed for determining the yield and the analytical data. In each case, such a blank test (designated in the table by capital letters) was conducted to exclude sources of errors due to changing impurities in the solvent, the monomer, or the catalyst components, in parallel to the polymerizations employing one of three regulator olefins (numbered examples). The regulators to be tested were admixed with the monomers in the examples. In Table 1, the amount of regulator is set forth in molar percent, based on the monomer employed.

TABLE 1

Polymerization of cyclopentene (100 ml. = 77.8 g. per experiment) in hexane (150 ml. per experiment).
Catalyst system: 0.5 millimol of tungsten hexachloride/4 millimols of ethylaluminum dichloride/0.5 millimol of ethanol per experiment.
Polymerization temperature: 0° C.

| Experiment No. | Polymerization Time (Hours) | Regulator (mol %) | Regulator Name | Yield (g) | Polymer RSV (dl/g) | Polymer Trans-Content (%) | Gel (%) |
|---|---|---|---|---|---|---|---|
| A | 2.5 | — | — | 8.7 | 2.8 | 80 | 2 |
| 1 | 2.5 | 1 | Vinyl fluoride | 7.5 | 2.0 | 79 | 2 |
| 2 | 2.5 | 1 | Vinyl chloride | 11.1 | 1.2 | 82 | 2 |
| 3 | 2.5 | 1 | Vinyl bromide | 21.3 | 1.0 | 80 | 2 |
| B | 2.5 | — | — | 16.3 | 4.39 | 94 | 3 |
| 4 | 2.5 | 1 | p-Bromostyrene | 13.5 | 2.64 | 93 | 3 |
| 5 | 2.5 | 1 | 2,4,6-Tribromostyrene | 19.6 | 3.55 | 88 | 3 |
| C | 2.5 | — | — | 25.0 | 2.30 | 100 | 2 |
| 6 | 2.5 | 1 | 3-Chlorobutene-1 | 13.9 | 1.37 | 94 | <2 |
| 7 | 2.5 | 1 | Methallyl chloride | 28.8 | 1.58 | 73 | 3 |
| 8 | 2.5 | 1 | Isocrotyl chloride (1-Chloro-2-methyl- | 34.8 | 2.20 | 93 | 2 |

TABLE 1-continued

Polymerization of cyclopentene (100 ml. = 77.8 g. per experiment) in hexane (150 ml. per experiment).
Catalyst system: 0.5 millimol of tungsten hexachloride/4 millimols of ethylaluminum dichloride/0.5 millimol of ethanol per experiment.
Polymerization temperature: 0° C.

| Experiment No. | Polymerization Time (Hours) | Regulator (mol %) | Name | Yield (g) | Polymer RSV (dl/g) | Trans-Content (%) | Gel (%) |
|---|---|---|---|---|---|---|---|
| | | | propene-1 | | | | |
| D | 24 | — | — | 19.7 | 5.96 | 94 | 4 |
| 9 | 24 | 1 | Allyl chloride | 8.2 | 0.79 | 82 | 6 |
| 10 | 24 | 1 | Crotyl chloride | 15.2 | 1.12 | 92 | 5 |
| E | 2.5 | — | — | 8.7 | 3.2 | 87 | 4 |
| 11 | 2.5 | 0.1 | 3,4-Dichlorobutene-1 | 12.3 | 2.5 | 86 | 4.5 |
| 12 | 2.5 | 1 | 3,4-Dichlorobutene-1 | 20.9 | 1.1 | 72 | 2 |

EXAMPLE 13 AND COMPARATIVE EXPERIMENT F

Copolymerization of Cyclopentene and Cyclooctene 50 ml. (38.9 g.) of cyclopentene and 50 ml. (42 g.) of cyclooctene were diluted with 150 ml. of hexane and cooled to 0° C. Then 0.5 millimol of tungsten hexachloride, 0.5 millimol of ethanol, and 3 millimols of ethylaluminum dichloride, and 5 millimols of vinyl bromide were added thereto under agitation. After 2.5 hours, the catalyst was decomposed in the manner described in Examples 1–12. The polymer was worked up in the manner described therein. There was obtained 58.5 g. of a polymer having an RSV of 1.9 dl./g. The polymer contained 76.8 molar percent of polyoctenamer units (determined by nuclear resonance analysis). 63% of the double bonds thereof detectable by ultrared spectroscopy was present in the trans-configuration and 37% was present in the cis-configuration.

In a comparative experiment wherein the vinyl bromide was omitted, there was obtained only 2.9 g. of a polymer having a reduced specific viscosity of 1.6 dl./g. and containing 35.7 molar percent of polyoctenamer units and a proportion of trans-double bonds of 92%.

EXAMPLE 14 AND COMPARATIVE EXPERIMENT G

Copolymerization of Cyclopentene and Cyclododecene

By replacing the cyclooctene in Example 13 by the same volume (43.5 g.) of cyclododecene and substituting 10 millimols of vinyl chloride for the vinyl bromide, 48.0 g. of a polymer was obtained having a reduced specific viscosity of 1.3 dl./g. and containing 48.4 molar percent of polydodecenamer units. 76% of the double bonds thereof detectable by ultrared spectroscopy are in the transconfiguration.

In a comparative experiment in which the vinyl chloride was omitted, only 1.8 g. was obtained of a polymer having a reduced specific viscosity of 1.7 dl./g., a content of polydodecenamer units of 11 molar percent, and a proportion of trans-double bonds of 82%.

It can be seen from Examples 13 and 14, as well as Comparative Experiments F and G that the polymerization of cyclopentene at 0° C. is strongly inhibited by the simultaneous presence of cyclooctene or cyclododecene. However, the addition of vinyl halogenides overcomes this inhibition and makes possible the production of copolymers in high yield.

EXAMPLE 15 AND COMPARATIVE EXPERIMENTS H AND J

Use of Ethylaluminum Sesquichloride 100 ml. (77.8 g.) of cyclopentene was diluted with 150 ml. of hexane and cooled to 0° C. Thereafter, 0.5 millimol of tungsten hexachloride, 0.5 millimol of ethanol, 3 millimols of ethylaluminum sesquichloride, and 5 millimols of vinyl bromide were added under agitation. After a reaction time of 2.5 hours, the catalyst was decomposed in the manner described in Examples 1–12. Working up the polymer in the manner disclosed therein, there was thus obtained 13.8 g. of a polypentenamer having an RSV of 1.2 dl./g. and a gel content of less than 2%. Of the double bonds detectable by ultrared spectroscopy, 77% were present in the trans-configuration.

In a comparative experiment in which the vinyl bromide was omitted, only 2.8 g. of polymer was obtained.

A further comparative experiment conducted without vinyl bromide wherein the ethylaluminum sesquichloride was replaced by ethylaluminum dichloride resulted in only a minor increase in yield to 5.8 g.

EXAMPLE 16

Use of Ethylaluminum Sesquichloride

Example 15 was repeated except the ethanol in the catalyst system was omitted. There was obtained 31.7 g. of a polypentenamer with a reduced specific viscosity of 1.4 dl./g. and a gel content of 2% with 75% of the double bonds present in the trans-configuration.

Examples 15 and 16 and Comparative Experiments H and J demonstrate that tungsten hexachloride, in combination with ethylaluminum sesquichloride and vinyl bromide, is a substantially more effective catalyst system for the ring-opening polymerization of cyclopentene than the combination of tungsten hexachloride with ethylaluminum dichloride and ethanol.

Similar results are obtained with the use of diethylaluminum chloride as the organometallic component of the catalyst system, the only difference being that the addition or omission of ethanol has practically no influence on the yield in polypentenamer increased by the use of vinyl bromide (39.4 g. or 40.0 g. in batches reacted in accordance with Examples 15 and 16).

EXAMPLES 17–25 AND COMPARATIVE EXPERIMENTS K–M

Polymerization of Various Cycloolefins

Examples 17–25 and Comparative Experiments K–M were conducted as described in Examples 1–12 and Comparative Experiments A–E. The solvent was technical hexane in all cases (boiling point limits: 68°–70° C.). The amount of the solvent was selected so that the solutions, prior to the polymerization, contained 20% by volume of cyclooctene or cyclododecene, or 10% by volume of 1,5-cyclooctadiene.

The polymerizates were worked up as described above and then analyzed.

COMPARATIVE EXPERIMENT SERIES N–T (See Table 3)

Comparative Experiments N–T were conducted in the manner described for Examples 1–12 and Comparative Experiments A–E. For each experiment, 100 ml. (87.5 g.) of cyclododecene were employed as the monomer and 150 ml. of technical hexane (boiling point limits: 68°–70° C.) were employed as the solvent. The various conjugated dienes were utilized in varying amounts. The molar percent of diolefins set forth in Table 3 refers, in each case, to the cycloolefin employed. For each experiment there was employed as the catalyst 0.5 millimol of tungsten hexachloride, 0.5 mil-

TABLE 2

Polymerization of various cycloolefins.
Catalyst system: 0.5 mmol tungsten hexachloride/0.5 mmol ethanol/changing amounts of ethylaluminum dichloride
Polymerization temperature: 20° C.

| Experiment No. | Monomer | (ml) | (g) | EtAlCl$_2$ in the Catalyst (mmol) | Polymerization Time (Hours) | Regulator (mol-%) | Regulator Name | Yield (g) | RSV (dl)/g | Polymer Trans-Content (%) | Gel (%) |
|---|---|---|---|---|---|---|---|---|---|---|---|
| K | Cyclooctene | 100 | 84 | 3 | 0.25 | — | — | 56.6 | 1.59 | 47 | — |
| 17 | | | | | | 0.1 | Vinyl chloride | 50.0 | 1.36 | 45 | — |
| 18 | | | | | | 1 | " | 52.9 | 1.26 | 34 | — |
| 19 | | | | | | 5 | " | 65.9 | 1.10 | 49 | — |
| L | Cyclododecene | 100 | 87 | 4 | 2.5 | — | — | 11.7 | 1.69 | 44 | — |
| 20 | | | | | | 1.0 | 1-Chloropropene | 21.4 | 1.30 | 42 | — |
| 21 | | | | | | 1.0 | 1,3-Dichloropropene | 13.9 | 1.25 | 42 | — |
| 22 | | | | | | 1.0 | 2-Methylene-1,3-dichloropropane | 9.0 | 1.07 | 48 | — |
| M | 1,5-Cyclooctadiene | 100 | 87.7 | 3 | 0.25 | — | — | 63.8 | 2.05 | 48 | 3 |
| 23 | | | | | | 0.1 | Vinyl bromide | 69.2 | 1.83 | 55 | 5 |
| 24 | | | | | | 1 | " | 70.0 | 1.47 | 66 | <2 |
| 25 | | | | | | 10 | " | 70.7 | 1.05 | 67 | <2 |

In Examples 17 through 22 and Comparative Experiments K and L, the RSV-values were measured in "Decalin" at 135° C.

limol of ethanol, and 3 millimols of ethylaluminum dichloride. In all experiments the polymerization time was 2.5 hours at 20° C. The polymerizates were worked up in a manner described above and then analyzed.

TABLE 3

| Experiment Series No. | Conjugated Diolefin Name | Mol-% | Yield g. | Polymer % | RSV dl/g | Trans % |
|---|---|---|---|---|---|---|
| N | 1,3-Butadiene | — | 21.9 | 25.2 | 1.96 | 40 |
| | | 1 | 0.8 | 0.9 | 0.30 | 40 |
| | | 5 | 0.2 | 0.2 | 0.06 | } too little |
| | | 10 | 0.3 | 0.3 | 0.07 | } substance |
| O | Isoprene | — | 46.1 | 53.0 | 2.25 | 46 |
| | | 1 | 47.1 | 54.2 | 1.07 | 44 |
| | | 2 | 10.1 | 11.6 | 0.94 | 52 |
| | | 5 | — | | No Polymer | |
| P | 2,3-Dimethylbutadiene | — | 21.6 | 24.8 | 2.15 | 45 |
| | | 1 | 12.0 | 13.8 | 1.25 | 46 |
| | | 5 | — | | No Polymer | |
| Q | 2,4-Hexadiene | — | 37.8 | 43.5 | 2.22 | 49 |
| | | 1 | 24.9 | 28.6 | 0.47 | 40 |
| | | 5 | 7.2 | 8.3 | 0.15 | 42 |
| | | 10 | — | | No Polymer | |
| R | Cyclopentadiene | — | 45.4 | 52.3 | 2.26 | 52 |
| | | 1 | 16.8 | 19.3 | 1.30 | 46 |
| | | 10 | 12.2 | 14.0 | (*) | 34 |
| S | 1,3-Cyclododecadiene | — | 47.3 | 54.2 | 2.16 | 43 |
| | | 1 | 13.9 | 16.0 | 1.02 | 42 |
| | | 5 | 1.8 | 2.1 | (*) | 40 |
| | | 10 | 1.5 | 1.7 | Too little substance | |

TABLE 3-continued

| Experiment Series No. | Conjugated Diolefin Name | Mol-% | Yield g. | Polymer % | RSV dl/g | Trans % |
|---|---|---|---|---|---|---|
| T | 1,3-Cyclooctadiene | — | 26.5 | 30.5 | 1.63 | 41 |
|   |   | 1 | 12.2 | 14.0 | 1.61 | 36 |
|   |   | 5 | 8.1 | 9.3 | 1.52 | 46 |
|   |   | 10 | 4.0 | 4.6 | 1.10 | 43 |

(*) Polymer contains insoluble components.
All RSV-values were measured at 135° C. in "Decalin."

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a catalyst system suitable for the ring-opening polymerization of cyclic olefins comprising (a) a salt of tungsten or of molybdenum and (b) an organoaluminum compound, the improvement wherein said catalyst system consists essentially of said components (a) and (b) in a molar ratio (a):(b) of less than 1:1 and (c) of vinylic halide halogenated hydrocarbon wherein one of the double bonded carbon atoms is substituted by one chlorine, bromine or iodine atom and at least one of the double bonded carbon atoms bears a hydrogen atom, the molar ratio of (a) to (c) being less than 100:1.

2. A catalyst system according to claim 1, further comprising (d) a compound selected from the group consisting of methanol, ethanol, isopropanol and tert.-butanol in a molar ratio of (a) to (d) of about 1:0.1 to 1:2.

3. A catalyst system according to claim 1, wherein component (a) is tungsten hexachloride or tungsten oxytetrachloride.

4. A catalyst system according to claim 1, wherein component (b) is an alkyl aluminum halide.

5. A catalyst system according to claim 4, wherein component (b) is ethylaluminum dichloride, ethylaluminum sesquichloride or diethylaluminum monochloride.

6. A catalyst system according to claim 1, wherein component (c) is α-ethylenically unsaturated and whose sole halogen substituent is a single chlorine, bromine or iodine atom on one of the ethylenically unsaturated carbon atoms.

7. A catalyst system according to claim 6, wherein component (c) is vinyl chloride, vinyl bromide or vinyl iodide.

8. A catalyst system according to claim 1, wherein (a) is tungsten hexachloride or tungsten oxytetrachloride; (b) is an alkyl aluminum halide; and the sole halogen substituent of (c) is a single chlorine, bromine or iodine atom.

9. A catalyst system according to claim 8, wherein (b) is ethylaluminum dichloride, ethylaluminum sesquichloride or diethylaluminum monochloride.

10. A catalyst system according to claim 9, wherein (c) is vinyl chloride, vinyl bromide or vinyl iodide.

11. A catalyst system according to claim 10, wherein the molar ratio of (a) to (b) is between 1:1 and 1:50 and the molar ratio of (a) to (c) is less than 10:1.

* * * * *